(12) United States Patent
Sridhar et al.

(10) Patent No.: US 11,012,316 B2
(45) Date of Patent: May 18, 2021

(54) METHODS AND APPARATUS TO GENERATE AND MANAGE WORKLOAD DOMAINS IN VIRTUAL SERVER RACKS

(71) Applicant: VMware, Inc., Palo Alto, CA (US)

(72) Inventors: Thayumanavan Sridhar, Sunnyvale, CA (US); Raj Yavatkar, Saratoga, CA (US); Chitrank Seshadri, Saratoga, CA (US)

(73) Assignee: VMWARE, INC., Palo Alto, CA (US)

( * ) Notice: Subject to any disclaimer, the term of this patent is extended or adjusted under 35 U.S.C. 154(b) by 290 days.

(21) Appl. No.: 15/655,678

(22) Filed: Jul. 20, 2017

(65) Prior Publication Data
US 2018/0343170 A1     Nov. 29, 2018

Related U.S. Application Data

(60) Provisional application No. 62/510,253, filed on May 23, 2017.

(51) Int. Cl.
*G06F 15/16* (2006.01)
*H04L 12/24* (2006.01)
*H04L 12/26* (2006.01)

(52) U.S. Cl.
CPC ........ *H04L 41/145* (2013.01); *H04L 41/0896* (2013.01); *H04L 41/22* (2013.01); *H04L 41/24* (2013.01); *H04L 41/5051* (2013.01); *H04L 43/0805* (2013.01); *H04L 41/0668* (2013.01); *H04L 41/5096* (2013.01); *H04L 43/0817* (2013.01)

(58) Field of Classification Search
CPC . H04L 29/06; H04L 29/08073; H04L 41/145; H04L 41/0896; H04L 41/22; H04L 41/24; H04L 41/5051; H04L 43/0805; H04L 43/0817
USPC .......................... 709/203, 220, 224, 226, 229
See application file for complete search history.

(56) References Cited

U.S. PATENT DOCUMENTS

| | | | | |
|---|---|---|---|---|
| 9,800,474 | B1 * | 10/2017 | Bush | H04L 63/20 |
| 10,439,912 | B2 * | 10/2019 | Ghosh | H04L 41/147 |
| 10,493,912 | B2 * | 12/2019 | Gibson | G01S 19/14 |
| 10,819,599 | B2 * | 10/2020 | Mahindru | H04L 43/0817 |
| 2004/0025069 | A1 * | 2/2004 | Gary | G06F 1/26 713/300 |
| 2004/0177244 | A1 * | 9/2004 | Murphy | G06F 9/5077 713/100 |
| 2004/0177245 | A1 * | 9/2004 | Murphy | G06F 9/44505 713/100 |
| 2005/0015504 | A1 * | 1/2005 | Dome | G06Q 10/04 709/229 |
| 2012/0272243 | A1 * | 10/2012 | Nolterieke | G06F 9/45558 718/1 |

(Continued)

*Primary Examiner* — Khanh Q Dinh
(74) *Attorney, Agent, or Firm* — Hanley, Flight & Zimmerman, LLC

(57) ABSTRACT

Methods, apparatus, systems and articles of manufacture are disclosed. An example apparatus includes a requirement translator to map a requirement to a hardware resource to execute an application in a workload domain, a cost calculator to calculate a cost for the hardware resource based on a demand for the hardware resource, an option generator to determine whether the cost exceeds a cost budget, and a resource allocator to add the hardware resource to the workload domain when the cost does not exceed the cost budget.

23 Claims, 10 Drawing Sheets

(56) References Cited

U.S. PATENT DOCUMENTS

| | | | |
|---|---|---|---|
| 2013/0185433 A1* | 7/2013 | Zhu | H04L 43/0882 709/226 |
| 2013/0304903 A1* | 11/2013 | Mick | H04L 67/10 709/224 |
| 2014/0250436 A1* | 9/2014 | Tang | G06F 9/45533 718/1 |
| 2015/0012634 A1* | 1/2015 | Zhu | H04L 67/303 709/223 |
| 2016/0127562 A1* | 5/2016 | Chauhan | H04M 15/47 379/114.14 |
| 2016/0127808 A1* | 5/2016 | Wong | H04L 45/125 379/112.04 |
| 2016/0142253 A1* | 5/2016 | Steinder | H04L 41/0813 709/221 |
| 2016/0142338 A1* | 5/2016 | Steinder | H04L 41/0813 709/226 |
| 2016/0191378 A1* | 6/2016 | Gopisetty | H04L 45/42 709/238 |
| 2017/0172592 A1* | 6/2017 | Janjua | A61B 17/12104 |
| 2017/0187592 A1* | 6/2017 | Ghosh | G05B 13/047 |
| 2017/0235570 A1* | 8/2017 | Catalano | G06F 8/60 717/101 |

\* cited by examiner

METHODS AND APPARATUS TO GENERATE AND MANAGE WORKLOAD DOMAINS IN VIRTUAL SERVER RACKS

This patent claims the benefit of the filing date of U.S. Provisional Patent Application Ser. No. 62/510,253 filed on May 23, 2017 and which is incorporated by reference herein in its entirety.

FIELD OF THE DISCLOSURE

This disclosure relates generally to cloud computing and, more particularly, to methods and apparatus to generate and manage workload domains in virtual server racks.

BACKGROUND

The virtualization of computer systems provides numerous benefits such as the execution of multiple computer systems on a single hardware computer, the replication of computer systems, the extension of computer systems across multiple hardware computers, etc. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
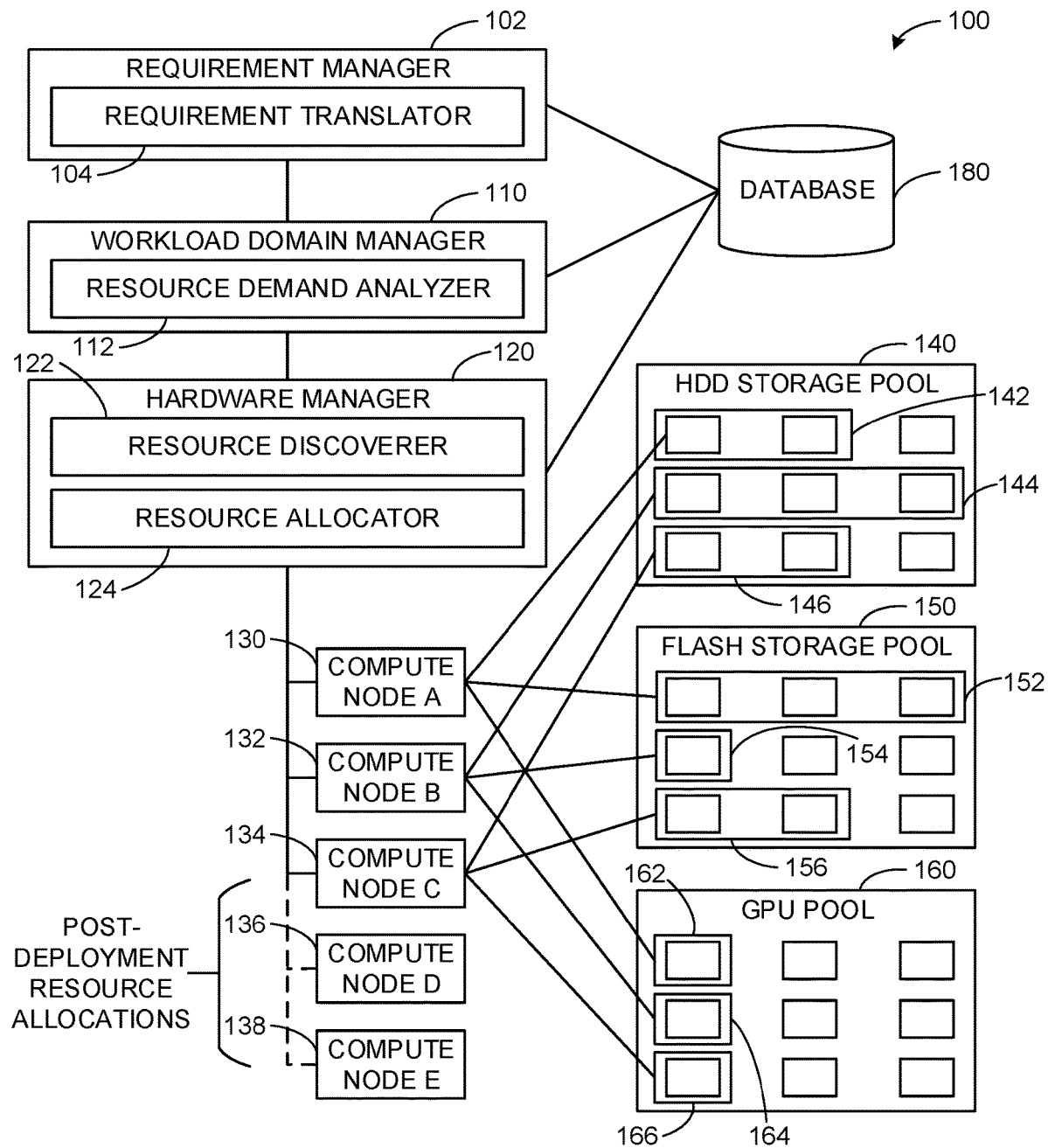
FIG. 1 is an example system that may be used to deploy virtual rack servers for use in examples disclosed herein to generate and manage workload domains in such virtual server racks.

Cloud computing is based on the deployment of many physical resources across a network, virtualizing the physical resources into virtual resources, and provisioning the virtual resources for use across cloud computing services and applications. Example systems for virtualizing computer systems are described in U.S. patent application Ser. No. 15/198,914, entitled "HARDWARE MANAGEMENT SYSTEMS FOR DISAGGREGATED RACK ARCHITECTURES IN VIRTUAL SERVER RACK DEPLOYMENTS," filed Jun. 30, 2016, and U.S. patent application Ser. No. 15/280,348, entitled "METHODS AND APPARATUS TO DEPLOY WORKLOAD DOMAINS IN VIRTUAL SERVER RACKS," filed Sep. 29, 2016, which are hereby incorporated by reference herein in their entireties.

When starting up a cloud computing environment or adding resources to an already established cloud computing environment, data center operators struggle to offer cost-effective services while making resources of the infrastructure (e.g., storage hardware, computing hardware, and networking hardware) work together to achieve simplified installation/operation and optimize the resources for improved performance. Prior techniques for establishing and maintaining data centers to provide cloud computing services often require customers to understand details and configurations of hardware resources to establish workload domains in which to execute customer services. In examples disclosed herein, workload domains are mapped to a management domain deployment (e.g., a cluster of hosts managed by a vSphere management product developed and provided by VMware, Inc.) in a single rack deployment in a manner that is relatively easier to understand and operate by users (e.g., clients, customers, etc.) than prior techniques. In this manner, as additional racks are added to a system, cross-rack clusters become an option. This enables creating more complex configurations for workload domains as there are more options for deployment as well as additional management domain capabilities that can be leveraged. Examples disclosed herein facilitate making workload domain configuration and management easier than prior techniques.

A management domain is a group of physical machines and virtual machines (VM) that host core cloud infrastructure components necessary for managing a software defined data center (SDDC) in a cloud computing environment that supports customer services. Cloud computing allows ubiquitous, convenient, on-demand network access to a shared pool of configurable computing resources (e.g., a pool of hardware resources, etc.). A cloud computing customer can request allocations of such resources to support services required by those customers. For example, when a customer requests to run one or more services in the cloud computing environment, one or more workload domains may be created based on resources in the shared pool of configurable computing resources. Examples disclosed herein enable customers to define different domain types, security, machine learning, capacity, availability, and performance requirements for establishing workload domains in server rack deployments without requiring the users to have in-depth knowledge of server rack hardware and/or configurations.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD), etc.), and power capabilities of a workload domain. As used herein, capacity refers to the aggregate number of resources (e.g., aggregate storage, aggregate CPU, aggregate respective hardware accelerators (e.g., field programmable gate arrays (FPGAs), graphic processing units (GPUs)), etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options). In some examples, resources are computing devices with set amounts of storage, memory, CPUs, etc. In some examples, resources are individual devices (e.g., hard drives, processors, memory chips, etc.).

Examples disclosed herein support numerous options and configuration capabilities for deploying workload domains. For example, numerous options for domain type, security, machine learning, availability, performance, capacity, etc., are supported for configuring workload domains. In addition, examples disclosed herein can support any number of user-requested capacities for workload domains. That is, examples disclosed herein may be implemented to inform a user of user-selectable capacities that may be used for configuring workload domains in particular rack deployments. In this manner, users' selections of capacities are based on capacities useable for configuring workload domains in particular rack deployments. That is, users are better informed of capacity capabilities of rack deployments to avoid confusion and incorrect parameters during workload domain configuration and management.

Examples disclosed herein enable deploying workload domains using optimal or highly suitable configurations that meet user-requested domain type, security, capacity, availability, performance, etc., configurations. In addition, examples disclosed herein enable generating expandable workload domains that maintain initial user-requested domain type, security, capacity, availability, and performance requirements until users request modifications to such initial user-requested capabilities and/or until changed operating conditions dictate that such modifications are appropriate. In addition, examples disclosed herein enable contractible workload domains to reduce allocated resources to the workload domain to dynamically reduce cost and/or optimize a deployed workload domain while still maintaining initial user-requested domain type, security, capacity, availability, performance, etc., requirements.

Examples disclosed herein obtain requirements of an application and map the requirements to one or more hardware resources to execute the application. For example, the application requirements may be translated into a quantification of central processing unit (CPU) processing in gigahertz, a number and/or a type of storage resources, a storage interconnect type, etc. In some disclosed examples, a cost (e.g., a monetary cost, etc.) of the mapped hardware resources is calculated based on weight factors corresponding to each type of hardware resource. As used herein, the term "weight factor" refers to a scaling factor corresponding to a demand for a hardware resource. For example, a larger weight factor may correspond to a more in-demand hardware resource compared to a smaller weight factor which may correspond to a less in-demand hardware resource. For example, each storage option (e.g., a hard-disk drive option, a solid-state drive option, etc.) has a corresponding weight factor. In such an example, a cost for each storage resource type may be calculated based on multiplying a number of storage resources (e.g., a number of hard-disk drives, a number of solid-state drives, etc.), a storage resource unit cost, and the corresponding weight factor (e.g., 100 hard disk drives×$45 unit cost×1.83 weighting factor=$8,235 cost). In such disclosed examples, a total cost is determined by calculating a sum of the individual costs. For example, a total cost of the mapped hardware resources may be a sum of the CPU processing costs, the storage resource costs, the storage interconnect costs, the FPGA utilization costs, the GPU utilization costs, etc.

In some disclosed examples, a weight factor is adjusted or scaled based on calculating one or more availability metrics. In such disclosed examples, available resources are discovered or polled to calculate one or more availability metrics (e.g., a percentage of storage capacity available, a number of graphic processing units available, etc.). The weight factor may be adjusted higher or lower based on the availability metrics. A higher weight factor corresponding to a hardware resource means that there is an increased demand for the hardware resource, and a lower weight factor corresponding to the hardware resource means that there is a decreased demand for the hardware resource. For example, a weight factor of two may be assigned to a solid-state drive option when between 50-60% of the solid-state drive capacity has been allocated, a weight factor of four may be assigned to the solid-state drive option when between 80-90% of the solid-state drive capacity has been allocated, etc. In such an example, the solid-state drive option weight factor may be adjusted from a two to a four based on (1) calculating the solid-state drive capacity to be 85% allocated, (2) comparing the 85% solid-state drive capacity allocation to a solid-state drive capacity allocation threshold of 80%, and (3) determining that the 85% solid-state drive capacity allocation is greater than the solid-state drive capacity allocation threshold of 80%. Additionally or alternatively, the weight factor may be adjusted based on analyzing a number of available hardware resources such as analyzing a number of available solid-state drives.

In some disclosed examples, a hardware configuration is optimized and deployed based on demand, supply, and status of hardware resources in one or more hardware resource pools. The deployed hardware configuration enables a right-sized virtualized server to execute the application. As used herein, the term "right-sized virtualized server" refers to a virtualized server corresponding to an optimal configuration of hardware resources that can execute an application based on one or more requirements such as capacity requirements, availability requirements, performance requirements, etc. In some disclosed examples, an optimal configuration includes a minimum quantity and/or number of types of hardware resources, a quantity and/or number of types of hardware resources that minimize a cost budget, etc. In some disclosed examples, a hardware configuration may be deployed and leased for a specified period of time with an option to extend either for the same cost, a higher or lower cost due to a market condition (e.g., a higher cost is calculated due to an increased demand of a hardware resource type, etc.), a lower cost due to shifting application execution to an off-peak time period, etc.

In some disclosed examples, a deployed workload domain is monitored for a change in status of a hardware resource. For example, a first solid-state drive allocated to the workload domain may be determined to be non-responsive (e.g., non-operational, not responding to a command or a request, etc.). In such an example, the first solid-state drive may be deallocated from the workload domain and a second solid-state drive (e.g., a hardware resource of the same hardware resource type of the first solid-state drive, etc.) that satisfies the original deployment requirements is allocated to the workload domain in place of the first solid-state drive.

In some disclosed examples, an efficiency of the deployed workload domain is monitored. In such disclosed examples, one or more efficiency metrics are calculated to determine how efficiently the deployed workload domain is using allocated hardware resources to execute an application based on one or more requirements (e.g., cost requirements, performance requirements, user requirements, etc.). For example, a loading of the allocated CPU processing resources may be calculated, a percentage of storage availability may be calculated, a storage interconnect latency may be calculated, etc. In such disclosed examples, the deployed workload domain may expand or contract based on the calculated efficiency metrics. For example, additional storage may be allocated to the workload domain if a storage availability percentage is compared to a threshold and the storage availability percentage satisfies the threshold (e.g., the storage availability percentage is less than 5%, 15%, 25%, etc.).

In such disclosed examples, the deployed workload domain can downgrade (e.g., the deployed workload domain contracts, etc.) or upgrade (e.g., the deployed workload domain expands, etc.) in performance based on the calculated efficiency metrics. For example, a storage interconnect may be upgraded from Ethernet to a non-volatile memory express storage interconnect due to a storage interconnect latency satisfying a threshold (e.g., a storage interconnect latency is greater than 10 microseconds, 100 microseconds, etc.). In such an example, the storage interconnect may be upgraded based on determining that the storage interconnect latency is greater than a threshold of 10 microseconds. In some disclosed examples, a threshold is determined based on the user requirements. For example, a user may select a requirement corresponding to a high performance of application execution, and the requirement is mapped to a threshold (e.g., a high-performance requirement is mapped to a storage interconnect latency threshold of 10 microseconds, etc.).

FIG. 1 is an example system that may be used to deploy virtual rack servers for use in examples disclosed herein to generate and manage workload domains in such virtual server racks. In the illustrated example, an example workload generation and deployment architecture 100 includes an example requirement manager 102, an example requirement translator 104, an example workload domain manager 110, an example resource demand analyzer 112, an example hardware manager 120, an example resource discoverer 122, and an example resource allocator 124. Further shown are an example compute node A 130, an example compute node B 132, an example compute node C 134, an example compute node D 136, and an example compute node E 138.

Further shown is a hard-disk drive (HDD) storage pool 140, which includes first, second, and third HDD storage sets 142, 144, 146. Further shown is a flash storage pool 150, which includes first, second, and third flash storage sets 152, 154, 156. The flash storage pool 150 may be implemented using solid-state drives, solid-state memory (e.g., memory using Intel® Optane™ technology, etc.). Further shown is a graphics processing unit (GPU) pool 160, which includes first, second, and third GPU sets 162, 164, 166. In some examples, GPU units in the GPU pool 160 can be used for machine-learning applications. Additionally or alternatively, any other number and/or type of pooled hardware resources used for acceleration, purposed infrastructure, etc., may be used such as field-programmable gate arrays (FPGAs), security devices (e.g., processors executing security decryption, encryption, monitoring services, etc.), etc.

An interface between a compute node and pooled hardware may be a peripheral component interconnect express (PCIe) interface, a serial attached SCSI (SAS) interface, a non-volatile memory express (NVMe) interface, a NVMe interface over fiber-optic communication interface, Ethernet (e.g., 10/25/100 gigabits per second Ethernet, etc.), etc., and/or any combination thereof. Additionally or alternatively, any other type of hardware interface may be used. For example, the interface between the compute node A 130 and the first HDD storage set 142 may be a PCIe interface. In another or the same example, the interface between the compute node A 130 and the first flash storage set 152 may be an NVMe interface. In yet another or the same example, the interface between the compute node B 132 and the second flash storage set 154 may be an Ethernet interface while the interface between the compute node C 134 and the third flash storage set 156 may be an NVMe interface.

In the illustrated example of FIG. 1, the requirement manager 102 communicates with a user interface (e.g., a graphical user interface and/or a command line interface of a webpage, application, and/or terminal interface) to present options to a user, receive selections of such options from the user, and map the selections to hardware resources. For example, the requirement manager 102 may present availability options, performance options, and/or capacity options for a workload domain to a user. The example requirement manager 102 may translate a user selection of the one or more options into user requirements. In such an example, the requirement manager 102 maps the user requirements into hardware resources. In some examples, the requirement manager 102 communicates with a database 180 to obtain requirements. The example requirement manager 102 may translate the obtained requirements into one or more availability options, performance options, and/or capacity options for a workload domain.

In some examples, the requirement manager 102 communicates an alert message to the user corresponding to an error (e.g., a message indicating that a workload domain cannot be generated based on the user requirements, etc.), a cost (e.g., a message indicating that a workload domain cannot be generated based on a cost budget, etc.), a detection of a non-responsive component (e.g., a flash storage resource allocated to the workload domain is non-operational, etc.), etc.

In the illustrated example of FIG. 1, the requirement manager 102 includes the requirement translator 104 to map user requirements into hardware resources. For example, the requirement translator 104 may map availability options, performance options, and/or capacity options to hardware resources such as resources in the HDD storage pool 140, the flash storage pool 150, the GPU pool 160, etc. In such examples, the requirement translator 104 may map a performance requirement to hardware resources such as CPUs, memory, mass storage, etc. In some examples, the requirement translator 104 creates, updates, or deletes requirements after a workload domain has been deployed due to a change in requirements by the user.

In the illustrated example of FIG. 1, the workload domain manager 110 analyzes a demand for hardware resources, generates option(s) for potential workload domains, ranks the generated option(s), and analyzes errors due to generating the option(s). For example, the workload domain manager 110 may discover available resources in the HDD storage pool 140, the flash storage pool 150, the GPU pool 160, etc. Additionally or alternatively, the workload domain manager 110 may discover any other available resources not illustrated in FIG. 1. The example workload domain manager 110 may generate one or more options based on the user requirements and the available resources. In response to generating the one or more options, the example workload domain manager 110 may rank the one or more options based on optimizing a configuration of hardware resources to match the user requirements within a tolerance (e.g., within a user-selected cost budget, etc.). In some examples, the workload domain manager 110 analyzes an error that occurs when the one or more options are generated, ranked, etc. For example, the workload domain manager 110 may determine that an error corresponding to an inability to generate a workload domain option is due to incompatible user requirements, an inappropriately-sized cost budget, etc.

In some examples, the workload domain manager 110 determines placement solutions for workload domains within a shared pool of configurable computing resources (e.g., the HDD storage pool 140, the flash storage pool 150, etc.). In some examples, the workload domain manager 110 determines what resources to allocate for workload domains based on the availability, performance, and capacity options selected by a user. In some examples, the workload domain manager 110 determines one or more placement solutions for one or more workload domains (e.g., from one or more users, etc.) concurrently, simultaneously, or substantially simultaneously. In such examples, the workload domain manager 110 communicates with the hardware manager 120 to request/receive a most recent list of accessible or available resources from the shared pool of configurable computing resources 140, 150, 160 prior to determining a placement solution. In some examples, the workload domain manager 110 requests the most recent list of resources to prevent allocating resources that have been allocated to another workload domain (e.g., a first workload domain is to have a first set of resources and a second workload domain is to have a second set of resources different from the first set of resources, etc.). Various placement solutions may be used including, selecting the least number of resources required to satisfy the capacity requirements, selecting one more than the least number of resources required to satisfy the capacity requirements, etc.

Once the example workload domain manager 110 has a most recent list of accessible resources, the workload domain manager 110 determines a placement solution for a workload domain using the most recent list of accessible resources based on the availability, performance, and/or capacity options selected by a user. For example, if a user selects a multi-rack option, the workload domain manager 110 determines a placement solution in a virtual server rack across a plurality of physical racks (e.g., allocate resources across five different racks). In such an example, the workload domain manager 110 may allocate one resource per rack. Alternatively, the example workload domain manager 110 may allocate all the resources of a first rack before moving to the next rack. In some examples, if a user selects a single-rack option, the workload domain manager 110 determines a vertical placement solution in a single physical rack (e.g., fill a single rack with one or more placement solutions, etc.). In some examples, a networking bandwidth within or across racks is a factor in determining the one or more placement solutions. For example, the resources in the first rack may be utilized instead of resources in a second rack due to a higher networking bandwidth in the first rack compared to a lower networking bandwidth in the second rack.

In the illustrated example, the workload domain manager 110 communicates with the hardware manager 120 to reserve the hardware resources associated with the placement solution. In some examples, after the hardware resources are reserved, the hardware manager 120 deploys the workload domain with the reserved hardware resources based on the user-selected availability, performance, and/or capacity options. For example, the hardware manager 120 may allocate the reserved hardware resources to the workload domain to execute the application.

In the illustrated example of FIG. 1, the workload domain manager 110 includes the resource demand analyzer 112 to calculate resource availability metrics based on discovered available hardware resources. As used herein, the term "available hardware resources" refers to a hardware resource such as a CPU, a solid-state drive, a GPU, etc., that is available to be allocated to a new workload domain due to the hardware resource not being allocated to an existing workload domain. For example, the resource demand analyzer 112 may calculate a resource availability metric such as a percentage of available memory resources (e.g., an available number of RAM GB with respect to a total number of RAM GB, etc.), a percentage of available mass storage resources (e.g., an available number of SSD GB with respect to a total number of SSD GB, etc.), etc. In some examples, the resource demand analyzer 112 calculates a weight factor, adjusts a weight factor, etc., based on the calculated resource availability metrics. Alternatively, the example resource demand analyzer 112 may calculate the weight factor, adjust the weight factor, etc., based on any other type of factor such as historical data, a time of day, etc.

In the illustrated example of FIG. 1, the hardware manager 120 reserves hardware resources associated with a placement solution for a workload domain. In some examples, after the resources are reserved, the hardware manager 120 deploys the workload domain with the reserved resources based on the user requirements.

In the illustrated example, the hardware manager 120 reserves resources from the shared pool of configurable computing resources based on placement solutions determined by the workload domain manager 110. In some examples, the hardware manager 120 allocates resources to and/or de-allocates resources from a workload domain. In some examples, the hardware manager 120 allocates and/or de-allocates resources between workload domains. In some such examples, the hardware manager 120 determines whether one or more workload domains can provide resource capacity requested by another workload domain and/or whether one workload domain can provide resource capacity requested by one or more workload domains. In some examples, the hardware manager 120 tracks the reservation, allocation, and/or de-allocation of resources by storing information associated with such reservation, allocation, and/or de-allocation of resources in the database 180.

In some examples, the hardware manager 120 discovers available resources. For example, the hardware manager 120 may poll the HDD storage pool 140, the flash storage pool 150, the GPU pool 160, etc., to determine a number of available resources within each respective pool. In some examples, the hardware manager 120 allocates hardware resources to a deployed workload domain. In some examples, the hardware manager 120 deallocates hardware resources from a deployed workload domain. In some examples, the hardware manager 120 determines operational status information of hardware resources. For example, the hardware manager 120 may determine that a HDD resource in the first HDD storage set 142 is non-responsive. In such an example, the hardware manager 120 may deallocate the non-responsive HDD resource from the first HDD storage set 142 and allocate an available HDD resource from the HDD storage pool 140 to the first HDD storage set 142.

In some examples, the hardware manager 120 finds configuration components for virtualizing a physical rack and obtains configuration parameters that such configuration components need for the virtualization process. In some examples, the hardware manager 120 calls the configuration components with their corresponding configuration parameters and events. In such examples, the hardware manager 120 obtains the configuration components with their corresponding configuration parameters and events from the database 180. In some examples, the hardware manager 120 maps the configuration parameters to user interface properties of example configurations for use by administrators to manage the virtual physical racks. In some examples, the hardware manager 120 implements configurator components that include configuration logic for configuring virtualization components of an example virtualization layer of one or more virtual servers.

In the illustrated example of FIG. 1, the compute node A 130, the compute node B 132, and the compute node C 134 represent processing systems to execute an application with each compute node including one or more CPUs to execute the application. In some examples, the compute nodes interface with additional hardware resources. For example, the compute node A 130 interfaces with the first HDD storage set 142, the first flash storage set 152, and the first GPU set 162. In the illustrated example, the first HDD storage set 142 includes two HDD storage units, the first flash storage set 152 includes three flash storage units, and the first GPU set 162 includes one GPU unit, where each unit represents a single instance of a hardware resource. For example, the first HDD storage set 142 includes two individual HDD storage devices. Alternatively, although only nine HDD storage units are shown in the HDD storage pool 140, there may be fewer or more than nine HDD storage units used. Alternatively, although only nine flash storage units are shown in the flash storage pool 150, there may be fewer or more than nine flash storage units used. Alternatively, although only nine GPU units are shown in the GPU pool 160, there may be fewer or more than nine GPU units used.

In the illustrated example of FIG. 1, the requirement manager 102 obtains user requirements for executing an application, and maps the user requirements to hardware resources via the requirement translator 104. In the illustrated example, the workload domain manager 110 generates and ranks workload domain options based on calculating one or more availability metrics via the resource demand analyzer 112. In the illustrated example, the hardware manager 120 discovers available hardware resources via the resource discoverer 122 and allocates the available hardware resources to deployed workload domains via the resource allocator 124. In the illustrated example, the hardware manager 120 deploys a workload domain that includes the compute node A 130, the compute node B 132, and the compute node C 134. In the illustrated example, the hardware manager 120 analyzes a status of one or more resources after the workload domain is deployed. In the illustrated example, the hardware manager 120 determines that additional compute nodes are necessary to execute the application in accordance with the user requirements. For example, the hardware manager 120 expands the workload domain by adding the compute node D 136 and the compute node E 138 to the workload domain. Connecting lines for the example compute node D 136 and the example compute node E 138 are illustrated using dashed lines to indicate that the compute node D 136 and the compute node E 138 are added after the workload domain is deployed, while the compute node A 130, the compute node B 132, and the compute node C 134 are added during an initial deployment of the workload domain.

The example database 180 stores information regarding the status of the shared pool of configurable resources such as for example, resources allocated from the shared pool of configurable resources to workload domains and/or resources de-allocated from workload domains to the shared pool of configurable computing resources 140, 150, 160. In some examples, the requirement manager 102 stores user-selected requirements, default options for workload domains, etc., in the database 180. In some examples, the workload domain manager 110 reads such status information for a most recent list of available resources prior to determining a placement solution. In some examples, the hardware manager 120 stores an operational status (e.g., an active status, a non-responsive status, etc.) of one or more hardware resources in the database 180. The example database 180 may be implemented by a volatile memory (e.g., a Synchronous Dynamic Random Access Memory (SDRAM), a Dynamic Random Access Memory (DRAM), a RAMBUS Dynamic Random Access Memory (RDRAM), etc.), one or more double data rate (DDR) memories, such as DDR, DDR2, DDR3, DDR4, mobile DDR (mDDR), etc., and/or a non-volatile memory (e.g., flash memory). The example database 180 may additionally or alternatively be implemented by one or more double data rate (DDR) memories, such as DDR, DDR2, DDR3, DDR4, mobile DDR (mDDR), etc. The example database 180 may additionally or alternatively be implemented by one or more mass storage devices such as hard disk drive(s), compact disk drive(s), digital versatile disk drive(s), solid-state disk drive(s), etc. While in the illustrated example the database 180 is illustrated as a single database, the database 180 may be implemented by any number and/or type(s) of databases. Furthermore, the data stored in the example database 180 may be in any data format such as, for example, binary data, comma delimited data, tab delimited data, structured query language (SQL) structures, etc.

Figure 2:
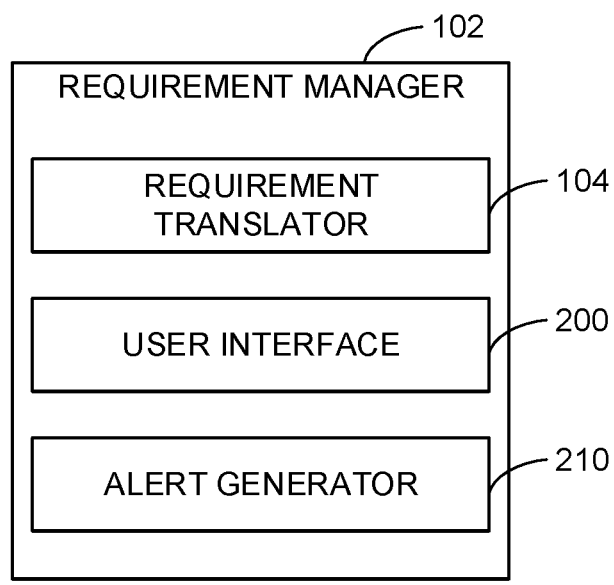
FIG. 2 is an example block diagram of the example requirement manager of FIG. 1 that can be implemented in accordance with the teachings of this disclosure.

FIG. 2 is an example block diagram of the example requirement manager 102 of FIG. 1 that can be implemented in accordance with the teachings of this disclosure. In the illustrated example of FIG. 2, the requirement manager 102 includes the example requirement translator 104 of FIG. 1, an example user interface 200, and an example alert generator 210.

In the illustrated example of FIG. 2, the requirement manager 102 includes the requirement translator 104 to map requirements obtained from a user to availability options, performance options, and/or capacity options for a workload domain, where the workload domain manager 110 of FIG. 1 generates the availability options, the performance options, and/or the capacity options. In some examples, the requirement translator 104 creates, updates, and/or deletes one or more requirements based on the availability options, performance options, and/or capacity options selected by a user. In some examples, the requirement translator 104 maps user requirements to availability options and/or performance options for a workload domain based on a user-selected workload domain type.

As disclosed herein, a user may select domain types such as, for example, an IaaS domain type, a PaaS domain type, a DaaS/VDI domain type, a development/test domain type, a production domain type, a Cloud Native domain type, an Openstack domain type, a Big Data domain type, a Machine Learning domain type, etc. In some examples, different domain types may be associated with one or more predetermined availability and/or performance options. For example, the requirement translator 104 may access a look-up-table stored in the database 180 of FIG. 1 for default availability and/or performance options associated with the domain types described above.

Based on the user-selected availability option(s) and/or performance option(s), the example requirement translator 104 maps the user requirements to one or more capacity option(s) capable of providing the user-selected availability option(s) and/or performance option(s). For example, the requirement translator 104 may map the user-selected capacity option to a number of hardware resources needed to execute an application based on the user-selected availability option(s) and/or performance option(s).

In some examples, the requirement translator 104 creates, updates, deletes, or otherwise modifies a previously mapped requirement based on a user request. For example, a user may want to increase capacity after a workload domain has been deployed. In such examples, the requirement translator defines, updates, deletes, or otherwise modifies the one or more requirements based on instructions received from the user (e.g., through the user interface 200, etc.). Alternatively, the example requirement translator 104 may create, update, delete, or otherwise modify a previously mapped requirement based on an automated execution (e.g., an automated process executing instructions based on a set of conditions, rules, component and/or network statuses, etc.).

In some examples, the requirement translator 104 obtains pre-defined acceptable requirements (e.g., requirements acceptable to a user, user requirements, etc.) from the database 180 of FIG. 1. In such examples or other examples, the pre-defined acceptable requirements are obtained from a user that include ranges of values that are acceptable to the user for a predetermined amount of time. For example, the user may select a range of acceptable cost values for SSD hardware resources prior to initial deployment of a workload domain. After deployment of the workload domain, the example requirement translator 104 may map the pre-defined requirements to additional or fewer SSD hardware resources within the constraints of the pre-defined requirements. In such an example, the requirement translator 104 may map the pre-defined requirements to hardware resources via an automated execution. For example, the requirement translator 104 may complete the mapping via the automated execution.

In the illustrated example of FIG. 2, the requirement manager 102 includes the user interface 200 to present one or more availability and/or performance options to a user for selection thereof. In some examples, the user interface 200 presents the availability and/or performance options to a user at a low level of detail (e.g., options such as low redundancy, normal redundancy, high redundancy 1, high redundancy 2, low performance, normal performance, high performance, etc.), such that the user need not understand the physical resources required to provide such availability and/or performance. In some examples, the user interface 200 presents the availability and/or performance options at a high level of detail (e.g., sliding scales representative of a number of redundant resources, CPU operating speeds, memory, storage, etc.). In some examples, the user interface 200 presents a number of capacity options to the user (e.g., four hardware resources could provide the user-selected availability option(s) and/performance option(s), but five hardware resources would be better, etc.). In some examples, the user interface 200 directs another component to deploy a workload domain. For example, the user interface 200 may prompt a user to select a workload domain option, recommendation, etc. In such an example, the requirement manager 102 may direct the hardware manager 120 to deploy the user-selected workload domain option, recommendation, etc., when the user selects one of the workload domain options, recommendations, etc. Alternatively, the requirement manager 102 may bypass the user interface 200 via one or more automated executions.

In the illustrated example of FIG. 2, the requirement manager 102 includes the alert generator 210 to generate and coordinate a display of an alert to a user. In some examples, the user interface 200 presents one capacity option to the user. In some examples, the workload domain manager 110 determines no capacity options are available to the user based on the selected availability option(s) and/or performance option(s). In such examples, the alert generator 210 generates an alert message indicating that there are no capacity options and directs the user interface 200 to present the alert message to the user. In some such examples, the alert generator 210 generates an alert message including recommendations to a user for adjusting the availability option(s) and/or performance option(s) to make one or more capacity options available. In some such examples, the alert generator 210 generates the alert messaged based on recommendations generated by the workload domain manager 110. In some such examples, multiple workload domains share a finite pool of computation resources such that capacity options may become unavailable due to a lack of resources. However, as disclosed herein, resources are allocated to different workload domains and/or de-allocated from workload domains such that capacity options may become available for the user-selected availability option(s) and/or performance option(s) at a later time. For example, the alert generator 210 may generate an alert message indicating that one or more user-selected options are not available at a user-specified time, but will be available at a later time (e.g., an off-peak time, etc.).

While an example manner of implementing the example requirement manager 102 of FIG. 1 is illustrated in FIG. 2, one or more of the elements, processes and/or devices illustrated in FIG. 2 may be combined, divided, re-arranged, omitted, eliminated and/or implemented in any other way. Further, the example requirement translator 104, the example user interface 200, the alert generator 210 and/or, more generally, the example requirement manager 102 may be implemented by hardware, software, firmware and/or any combination of hardware, software and/or firmware. Thus, for example, any of the example requirement translator 104, the example user interface 200, the alert generator 210 and/or, more generally, the example requirement manager 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example requirement translator 104, the example user interface 200, and/or the example alert generator 210 is/are hereby expressly defined to include a non-transitory computer readable storage device or storage disk such as a memory, a digital versatile disk (DVD), a compact disk (CD), a Blu-ray disk, etc. including the software and/or firmware. Further still, the example requirement manager 102 of FIG. 1 may include one or more elements, processes and/or devices in addition to, or instead of, those illustrated in FIG. 2, and/or may include more than one of any or all of the illustrated elements, processes and devices.

Figure 3:
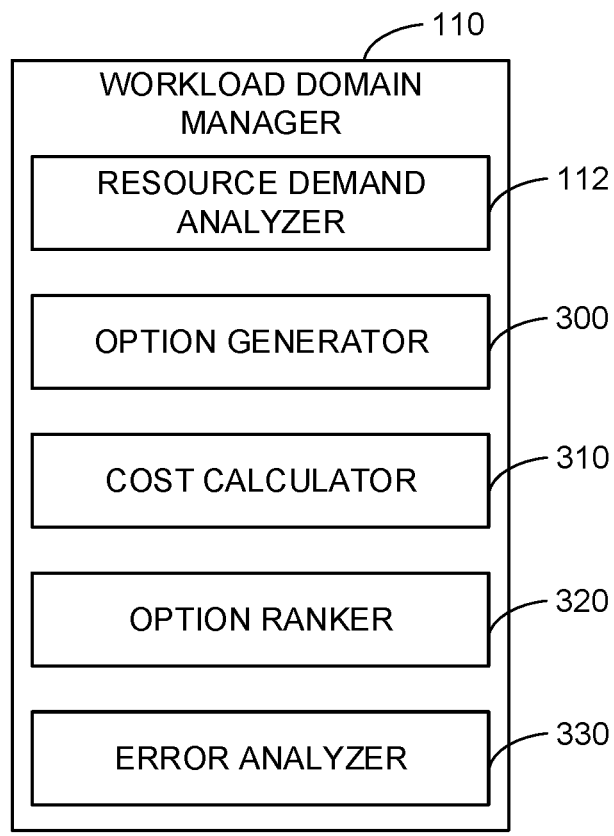
FIG. 3 is an example block diagram of the example workload domain manager of FIG. 1 that can be implemented in accordance with the teachings of this disclosure.

FIG. 3 is an example block diagram of the example workload domain manager 110 of FIG. 1 that can be implemented in accordance with the teachings of this disclosure. In the illustrated example of FIG. 3, the workload domain manager 110 includes the example resource demand analyzer 112 of FIG. 1, an example option generator 300, an example cost calculator 310, an example option ranker 320, and an example error analyzer 330.

In the illustrated example of FIG. 3, the workload domain manager 110 includes the resource demand analyzer 112 to calculate resource availability metrics based on discovered available hardware resources. For example, the resource demand analyzer 112 may calculate a resource availability metric such as a percentage of available GPU resources (e.g., an available number of GPUs with respect to a total number of GPUs, etc.), a percentage of available processing resources (e.g., an available number of CPUs with respect to a total number of CPUs, etc.), etc.

In some examples, the resource demand analyzer 112 calculates a weight factor, adjusts a weight factor, etc., based on the calculated resource availability metrics. For example, the resource demand analyzer 112 may calculate a weight factor for a storage type such as SSD resources. In such an example, the resource demand analyzer 112 may calculate the weight factor for the SSD resources based on a number of SSD resources available in the flash storage pool 150 of FIG. 1. For example, a lower weight factor for the SSD resources means that there are more available SSD resources available to be assigned to a workload domain, and a higher weight factor for the SSD resources means that there are fewer available SSD resources available to be assigned to a workload domain.

In another example, the resource demand analyzer 112 may calculate the weight factor based on a percentage of available SSD resources. For example, a higher weight factor may correspond to a lower percentage of available SSD resources, and a lower weight factor may correspond to a higher percentage of available SSD resources. For example, a lower percentage of available SSD resources indicates an increased demand for SSD resources and, thus, a higher weight factor may be calculated based on the increased demand to calculate a market-driven cost for the SSDs. For example, the resource demand analyzer 112 may compare the percentage to a threshold (e.g., the percentage is less than 10%, 20%, etc.). For example, the resource demand analyzer 112 may calculate the percentage of available SSD resources in the flash storage pool 150 to be 10%, which satisfies a 20% threshold by being less than 20% indicating that there is a high demand for SSD resources (e.g., because less than 20% of SSD resources are available to be allocated). In response to the percentage satisfying the threshold, the example resource demand analyzer 112 may adjust the weight factor. In such an example where there is a high demand for a resource (e.g., an availability percentage less than 10%, 20%, etc.), the resource demand analyzer 112 may increase the weight factor from a base value (e.g., a base value of one, etc.). In such an example where there is a low demand for a resource (e.g., an availability percentage greater than 80%, 90%, etc.), the resource demand analyzer 112 may decrease the weight factor from the base value.

After the example resource demand analyzer 112 calculates the weight factor, the resource demand analyzer 112 may adjust the weight factor at a later time to yield a new weight factor based on, for example, historical data, a time of day, etc. For example, the resource demand analyzer 112 may adjust a weight factor based on historical data such as trend data (e.g., demand for hardware resources has increased in consecutive days, over a time period, etc.), data corresponding to the same time period on a different day, year, etc. In some examples, the resource demand analyzer 112 decreases the weight factor based on the user specifying an execution time period that historically has experienced low demand for hardware resources. In other examples, the resource demand analyzer 112 increases a weight factor based on the user specifying a peak execution time period (e.g., a peak time of day in which the user wants to execute an application, etc.) to execute the application.

In some examples, the resource demand analyzer 112 selects a hardware resource type to process. For example, the resource demand analyzer 112 may select the HDD storage pool 140, the flash storage pool 150, the GPU pool 160, etc., to process. In some examples, the resource demand analyzer 112 determines whether there is another hardware resource type to process. For example, the resource demand analyzer 112 may determine that the flash storage pool 150 has yet to be processed.

In the illustrated example of FIG. 3, the workload domain manager 110 includes the option generator 300 to generate one or more configurations of hardware resources for a workload domain based on user requirements and/or available hardware resources. For example, the option generator 300 may obtain the user requirements, one or more weight factors, a list of available hardware resources, etc., and generate one or more configurations of hardware resources. For example, the option generator 300 may determine a configuration of hardware resources that includes a number of CPUs to satisfy a user requirement for processing power. In another example, the option generator 300 may determine a number of HDD storage resources, a number of flash storage resources, a number of GPU resources, etc., and/or a combination thereof to satisfy one or more user requirements.

In some examples, the option generator 300 generates a hardware resource configuration to satisfy user requirements but does not maximize a corresponding cost budget. For example, the option generator 300 may determine one or more types of hardware resources, a number of hardware resources for each hardware resource type, etc., that satisfies the user requirements while leaving a portion of the cost budget unused. Alternatively, the option generator 300 may generate a hardware resource configuration that uses the portion of the unused cost budget to add additional hardware resources such as additional CPUs, GPUs, HDDs, SSDs, etc., and/or a combination thereof to minimize unused cost budget.

In some examples, the option generator 300 generates an option that includes two or more storage types to create a caching-tier. For example, the option generator 300 may generate a hardware configuration that includes a HDD storage unit and a flash storage unit. In such an example, the deployed workload domain may use the flash storage unit to execute the application and use the HDD storage unit to store calculated results, information yet to be processed, etc. In such an example, the option generator 300 may generate a caching-tier to satisfy a user-requirement for performance while reducing a total cost associated with using more expensive hardware resources for a longer period of time.

In the illustrated example of FIG. 3, the workload domain manager 110 includes the cost calculator 310 to calculate a cost (e.g., a monetary cost, a power cost (e.g., a number of kilowatts per hour consumed, etc.), etc.) of one or more hardware resources. In some examples, the cost calculator 310 calculates a cost of an individual hardware resource. For example, the cost calculator 310 may determine a cost for a HDD storage unit in the HDD storage pool 140 based on multiplying a base cost (e.g., a cost corresponding to a price per hour of operation, etc.) by a weight factor. In some examples, the cost calculator 310 calculates a cost for a hardware resource type. For example, the cost calculator 310 may calculate a total cost for the first HDD storage set 142 based on calculating a sum of each corresponding individual HDD storage unit cost. In some examples, the cost calculator 310 calculates a cost for an entire hardware configuration. For example, the cost calculator 310 may calculate a total cost of hardware resources for a workload domain option. In such an example, the cost calculator 310 may calculate a total cost based on the costs of the compute node A 130, the compute node B 132, the compute node C 134, the compute node D 136, the compute node E 138, the first, second, and third HDD storage sets 142, 144, 146, the first, second, and third flash storage sets 152, 154, 156, and the first, second, and third GPU sets 162, 164, 166 of FIG. 1.

In some examples, the cost calculator 310 determines whether a cost for a hardware configuration satisfies a threshold. In such examples, the cost calculator 310 compares a calculated cost (e.g., a total hardware cost) to a cost budget threshold (e.g., a user-specified cost budget, etc.) and determines whether the calculated cost satisfies the cost budget threshold (e.g., is within the cost budget). In such examples, the cost calculator 310 generates an error when the calculated cost exceeds the cost budget threshold (e.g., the calculated cost exceeds the user-specified cost budget, etc.).

In the illustrated example of FIG. 3, the workload domain manager 110 includes the option ranker 320 to rank one or more options generated by the option generator 300. In some examples, the option ranker 320 ranks a null set when no options are generated by the option generator 300. In such examples, the option ranker 320 sets a flag (e.g., a flag in computer readable instructions, etc.) to be analyzed or read by the error analyzer 330 to generate an error. In some examples, the option ranker 320 ranks the one or more options based on hardware resource cost, a number of hardware resources, etc. In some examples, the option ranker 320 selects one or more hardware resources based on the one or more hardware resources being included in the highest ranked option. For example, the option ranker 320 may select the first HDD storage set 142 to be allocated to a workload domain based on the first HDD storage set 142 being included in the highest ranked option for storage options for executing an application.

In the illustrated example of FIG. 3, the workload domain manager 110 includes the error analyzer 330 to analyze an error generated by the option generator 300, the option ranker 320, etc. For example, the error analyzer 330 may determine that an error generated by the option generator 300 indicates that a number of hardware resources needed is greater than a number of available hardware resources. In such an example, the error analyzer 330 may determine that the error generated by the option generator 300 indicates that a number of GPUs needed is greater than a number of GPUs in the GPU pool 160 of FIG. 1. In another example, the error analyzer 330 may determine that an error generated by the option generator 300 indicates that a total hardware cost for a hardware configuration to meet user requirements is greater than the cost budget allocated by the user. In yet another example, the error analyzer 330 may determine that an error generated by the option ranker 320 indicates that there are no options for the option ranker 320 to rank. Additionally or alternatively, any other type of error may be analyzed, categorized, characterized, etc., by the example error analyzer 330.

While an example manner of implementing the example workload domain manager 110 of FIG. 1 is illustrated in FIG. 3, one or more of the elements, processes and/or devices illustrated in FIG. 3 may be combined, divided, re-arranged, omitted, eliminated and/or implemented in any other way. Further, the example resource demand analyzer 112, the example option generator 300, the example cost calculator 310, the example option ranker 320, the example error analyzer 330 and/or, more generally, the example workload domain manger 110 may be implemented by hardware, software, firmware and/or any combination of hardware, software and/or firmware. Thus, for example, any of the example resource demand analyzer 112, the example option generator 300, the example cost calculator 310, the example option ranker 320, the example error analyzer 330 and/or, more generally, the example workload domain manger 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example resource demand analyzer, the example option generator 300, the example cost calculator 310, the example option ranker 320, and/or the example error analyzer 330 is/are hereby expressly defined to include a non-transitory computer readable storage device or storage disk such as a memory, a digital versatile disk (DVD), a compact disk (CD), a Blu-ray disk, etc. including the software and/or firmware. Further still, the example workload domain manager 110 of FIG. 1 may include one or more elements, processes and/or devices in addition to, or instead of, those illustrated in FIG. 3, and/or may include more than one of any or all of the illustrated elements, processes and devices.

Figure 4:
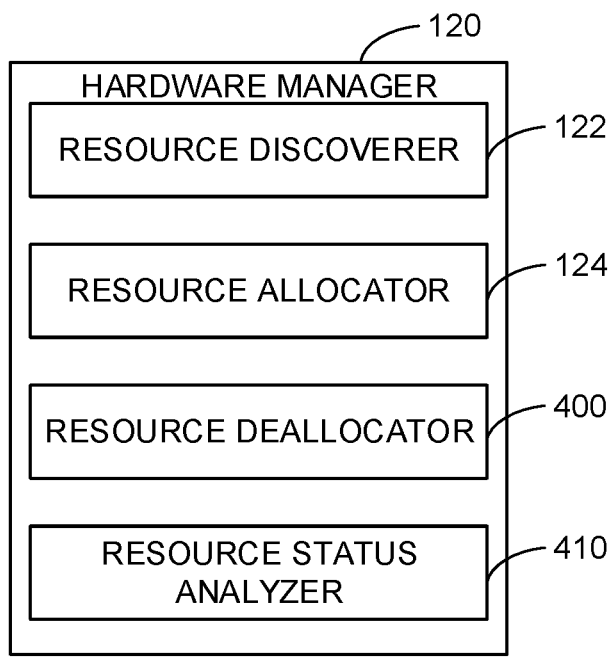
FIG. 4 is an example block diagram of the example hardware manager of FIG. 1 that can be implemented in accordance with the teachings of this disclosure.

FIG. 4 is an example block diagram of the example hardware manager 120 of FIG. 1 that can be implemented in accordance with the teachings of this disclosure. The example hardware manager 120 is provided to provision, maintain, allocate, and/or manage physical hardware resources for use by a virtual server rack for provisioning and allocating logical resources. The example hardware manager 120 includes the example resource discoverer 122 of FIG. 1, the example resource allocator 124 of FIG. 1, an example resource deallocator 400, and an example resource status analyzer 410.

In the illustrated example of FIG. 4, the hardware manager 120 includes the resource discoverer 122 to discover or poll available hardware resources in one or more hardware resource pools. For example, the hardware manager 120 may poll the HDD storage pool 140, the flash storage pool 150, the GPU pool 160, etc., and/or a combination thereof to determine hardware resources not allocated to a workload domain. Additionally or alternatively, the resource discoverer 122 may poll hardware resources that are allocated to a workload domain.

In the illustrated example of FIG. 4, the hardware manager 120 includes the resource allocator 124 to add a hardware resource to a workload domain during an initial deployment of the workload domain. For example, the resource allocator 124 may add the first HDD storage set 142 to the same workload domain as the compute node A 130. In some examples, the resource allocator 124 adds a hardware resource to an existing workload domain. For example, the resource allocator 124 may add an additional HDD storage unit, an additional flash storage unit, an additional GPU, etc., to an existing workload domain. In some examples, the hardware manager 120 recomposes the workload domain when a hardware resource is added to the workload domain.

In the illustrated example of FIG. 4, the hardware manager 120 includes the resource deallocator 400 to remove a hardware resource from a workload domain during an initial deployment of the workload domain. For example, a user may adjust one or more requirements via the user interface 200 of FIG. 2 causing a contraction in the workload domain during the initial deployment. For example, the resource deallocator 400 may remove the first HDD storage set 142 from the same workload domain as the compute node A 130. In some examples, the resource deallocator 400 removes a hardware resource from an existing workload domain. For example, the resource deallocator 400 may remove an HDD unit from the first HDD storage set 142 or may remove the first HDD storage set 142 in its entirety after the workload domain has been deployed. In some examples, to decompose a workload domain, the hardware manager 120 uses the resource deallocator 400 to remove hardware resources from the workload domain.

In the illustrated example of FIG. 4, the hardware manager 120 includes the resource status analyzer 410 to determine an operational status of one or more hardware resources, detect a non-responsive status of one or more hardware resources, etc. For example, the resource status analyzer 410 may obtain an operational status from a flash storage unit in the first flash storage set 152 of FIG. 1. The operational status may include an active status that indicates that the flash storage unit is functioning correctly. Alternatively, the operational status may include a non-responsive status that indicates that the hardware resource is non-operational, not responding to a command or query, etc. In response to determining that a hardware resource is non-responsive, the example resource status analyzer 410 may direct the resource deallocator 400 to remove the non-responsive hardware resource from the workload domain.

In some examples, the resource status analyzer 410 monitors the availability, the performance, and/or the capacity of a deployed workload domain and compares the availability, the performance, and/or the capacity to the user requirements. For example, the resource status analyzer 410 may determine that the first HDD storage set 142 is being underutilized due to excess storage in a corresponding workload domain. In such an example, the resource status analyzer 410 may direct the resource deallocator 400 to remove one or more HDD storage units from the first HDD storage set 142. In other examples, the resource status analyzer 410 may determine that the compute node A 130, the compute node B 132, and the compute node C 134 are heavily loaded and need more CPU processing power. In such examples, the resource status analyzer 410 may direct the resource allocator 124 to add the compute node D 136, the compute node E 138, etc., to the deployed workload domain.

In some examples, the resource status analyzer 410 selects a hardware resource type to process. For example, the resource status analyzer 410 may select the HDD storage pool 140, the flash storage pool 150, the GPU pool 160, etc., to process. In some examples, the resource status analyzer 410 determines whether there is another hardware resource type to process. For example, the resource status analyzer 410 may determine that the flash storage pool 150 has yet to be processed. In some examples, the resource status analyzer 410 selects a non-responsive hardware resource to process. In some examples, the resource status analyzer 410 determines whether there is another non-responsive hardware resource to process.

While an example manner of implementing the hardware manager 120 of FIG. 1 is illustrated in FIG. 4, one or more of the elements, processes and/or devices illustrated in FIG. 4 may be combined, divided, re-arranged, omitted, eliminated and/or implemented in any other way. Further, the example resource discoverer 122, the example resource allocator 124, the example resource deallocator 400, the example resource status analyzer 410 and/or, more generally, the example hardware manager 120 of FIG. 1 may be implemented by hardware, software, firmware and/or any combination of hardware, software and/or firmware. Thus, for example, any of the example resource discoverer 122, the example resource allocator 124, the example resource deallocator 400, the example resource status analyzer 410 and/or, more generally, the example hardware manager 120 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example resource discoverer 122, the example resource allocator 124, the example resource deallocator 400, and/or the example resource status analyzer 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example hardware manager 120 of FIG. 1 may include one or more elements, processes and/or devices in addition to, or instead of, those illustrated in FIG. 4, and/or may include more than one of any or all of the illustrated elements, processes and devices.

Figure 5:
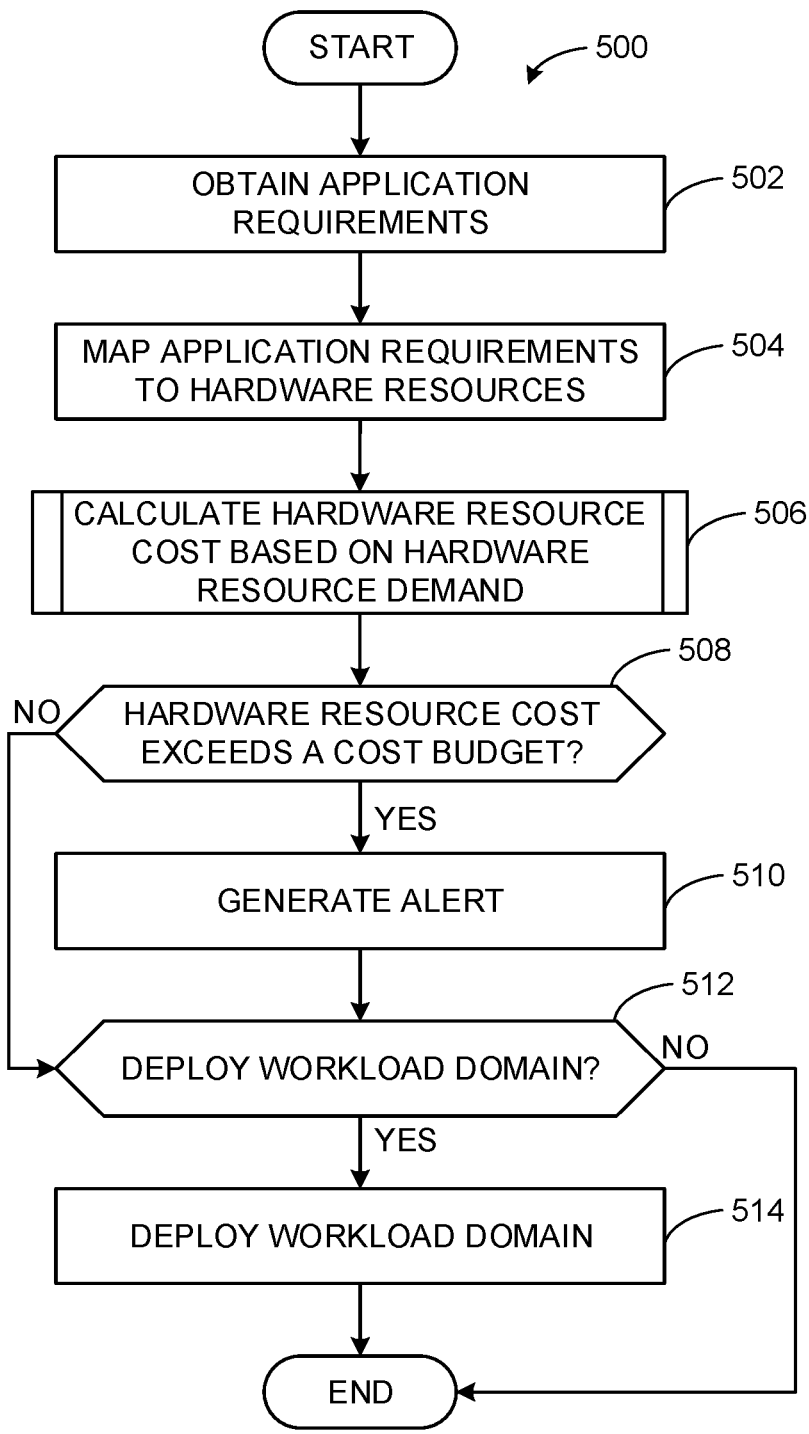
FIG. 5 is a flow diagram representative of example computer readable instructions that may be executed to implement the example requirement manager of FIGS. 1-2, the example workload domain manager of FIGS. 1 and 3, and the example hardware manager of FIGS. 1 and 4 to generate and deploy a workload domain in virtual server racks.
Figure 6:
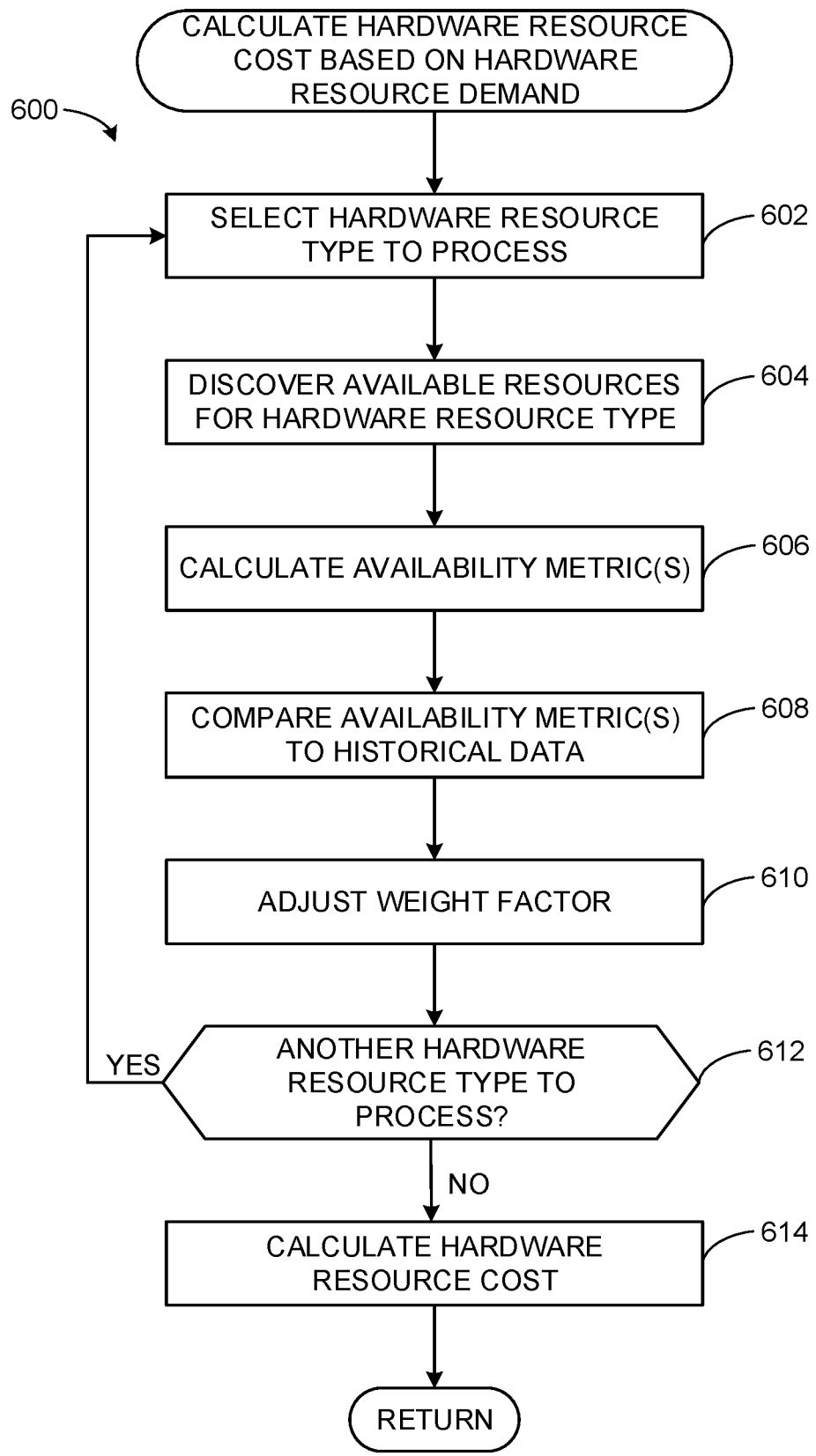
FIG. 6 is a flow diagram representative of example computer readable instructions that may be executed to implement the example workload domain manager of FIGS. 1 and 3, and the example hardware manager of FIGS. 1 and 4 to calculate a hardware resource cost of a workload domain in virtual server racks.
Figure 7:
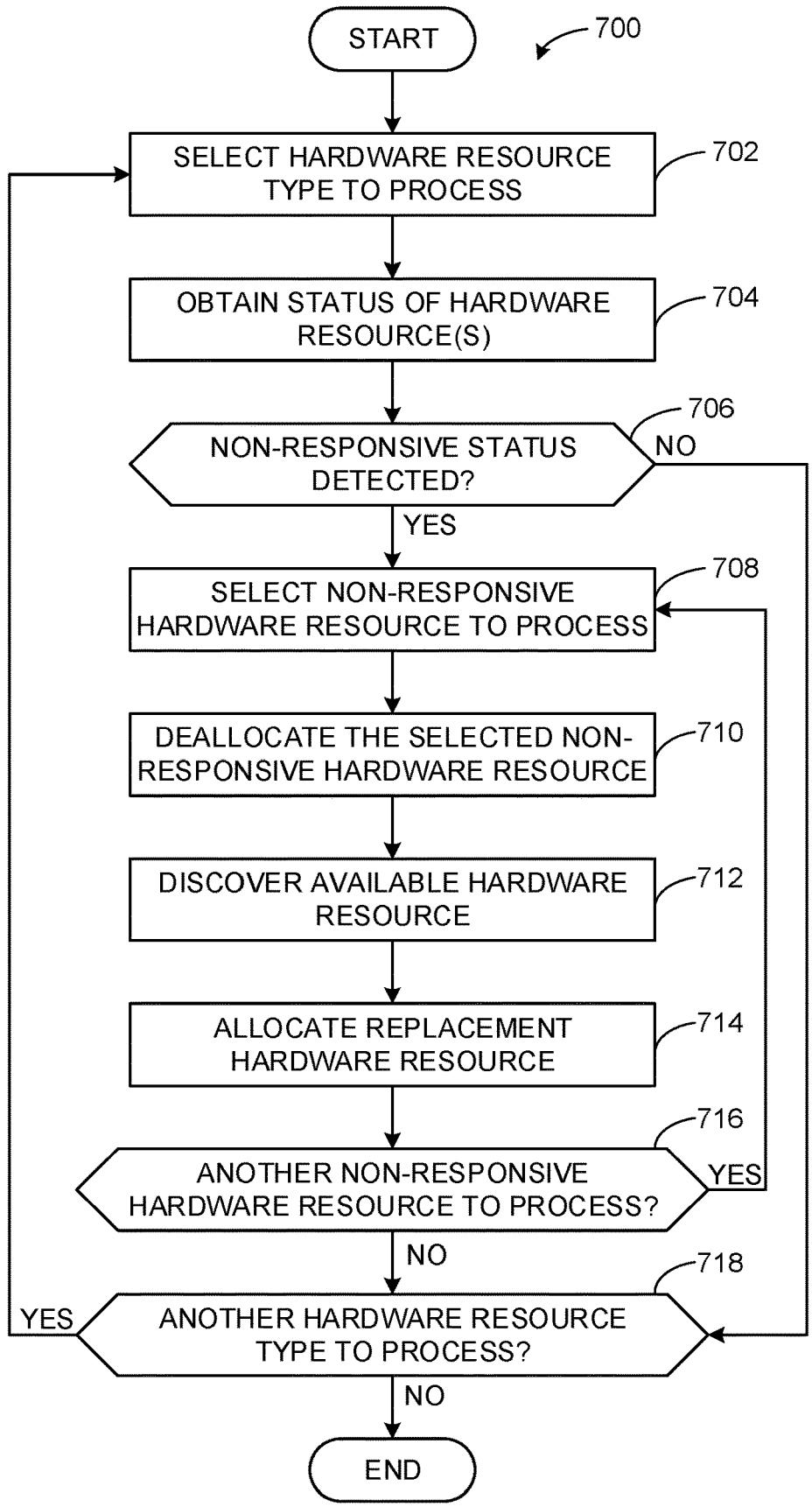
FIG. 7 is a flow diagram representative of example computer readable instructions that may be executed to implement the example hardware manager of FIGS. 1 and 4 to manage a workload domain in virtual server racks.

Flowcharts representative of example machine readable instructions for implementing the example requirement manager 102 of FIGS. 1-2, the example workload domain manager 110 of FIGS. 1 and 3, and/or the example hardware manager 120 of FIGS. 1 and 4 are shown in FIGS. 5-7. In these examples, the machine readable instructions implement one or more programs for execution by a processor such as the processors 812, 912, 1012 shown in the example processor platforms 800, 900, 1000 discussed below in connection with FIGS. 8-10. The program(s) may be embodied in software stored on a non-transitory computer readable storage medium such as a CD-ROM, a floppy disk, a hard drive, a digital versatile disk (DVD), a Blu-ray disk, or a memory associated with the processors 812, 912, 1012, but the entire program and/or parts thereof could alternatively be executed by a device other than the processors 812, 912, 1012 and/or embodied in firmware or dedicated hardware. Further, although the example program(s) is/are described with reference to the flowcharts illustrated in FIGS. 5-7, many other methods of implementing the example requirement manager 102, the example workload domain manager 110, and/or the example hardware manager 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

FIG. 5 is a flowchart representative of an example method 500 that may be performed by the example requirement manager 102 of FIGS. 1-2, the example workload domain manager 110 of FIGS. 1 and 3, and/or the example hardware manager 120 of FIGS. 1 and 4 to generate and manage a workload domain in virtual server racks. The example method 500 begins at block 502 when the example requirement manager 102 obtains application requirements from a user. For example, the user interface 200 (FIG. 2) may obtain user selections corresponding to availability options, performance options, capacity options, etc.

At block 504, the example requirement manager 102 maps application requirements to hardware resources. For example, the requirement translator 104 (FIGS. 1-2) may map a user selection for a performance option to one or more CPUs, HDD storage units, flash storage units, GPUs, etc., (e.g., hardware resources in the HDD storage pool 140, the flash storage pool 150, and/or the GPU pool 160 of FIG. 1). Alternatively, the example requirement translator 104 may map a user selection to a default configuration in the database 180 of FIG. 1.

At block 506, the example workload domain manager 110 calculates a hardware resource cost based on hardware resource demand. For example, the cost calculator 310 (FIG. 3) may calculate a hardware resource cost for a number of SSDs in a generated hardware configuration. In such an example, the cost calculator 310 may calculate a SSD hardware resource cost by multiplying a number of SSD hardware resources by a weight factor, where the weight factor is determined based on one or more availability metrics calculated by the resource demand analyzer 112 (FIG. 1). An example process that may be used to implement block 506 is described below in connection with FIG. 6.

At block 508, the example workload domain manager 110 determines whether a hardware resource cost exceeds a cost-budget. For example, the cost calculator 310 may compare a total hardware cost to a user-specified cost budget and determine that the total hardware cost exceeds the cost budget (e.g., the total hardware cost does not satisfy the user-specified cost budget threshold, etc.).

If, at block 508, the example workload domain manager 110 determines that the hardware resource cost does not exceed the cost budget, control proceeds to block 512 to determine whether to deploy a workload domain. If, at block 508, the example workload domain manager 110 determines that the hardware resource cost exceeds the cost budget, then, at block 510, the example requirement manager 102 generates an alert. For example, the alert generator 210 may generate an alert and direct the user interface 200 to display the alert indicating that there are no workload domain options that satisfy the user-specified requirements and/or are within the cost budget. In response to the generation of the alert, the example user interface 200 may prompt the user for a change in requirements, a change in the cost budget, etc.

At block 512, the example requirement manager 102 determines whether to deploy a workload domain. For example, the user interface 200 may prompt the user to choose a generated workload domain option, recommendation, etc., for deployment. In such an example, in response to the user choosing one of the generated workload domain options, the requirement manager 102 may direct the resource allocator 124 to initiate deployment of the user-selected workload domain option. Alternatively, the example requirement manager 102 may bypass the user interface 200 and choose one of the generated workload domain options via an automated execution.

If, at block 512, the example requirement manager 102 determines to deploy the workload domain, then, at block 514, the example hardware manager 120 deploys the workload domain. For example, the resource allocator 124 (FIGS. 1 and 4) may allocate one or more hardware resources such as CPUs, HDD storage units, flash storage units, GPUs, etc., to the workload domain based on a workload domain option generated by the option generator 300 (FIG. 3). If, at block 512, the example requirement manager 102 determines not to deploy the workload domain, then the example method 500 concludes.

FIG. 6 is a flowchart representative of an example method 600 that may be performed by the example workload domain manager 110 of FIGS. 1 and 3 and the hardware manager 120 of FIGS. 1 and 4 to calculate a hardware resource cost for a hardware configuration to deploy a workload domain in virtual server racks. The example process of FIG. 6 may be used to implement the operation of block 506 of FIG. 5. The example method 600 begins at block 602 when the example workload domain manager 110 selects a resource type to process. For example, the resource demand analyzer 112 (FIGS. 1 and 3) may select the HDD storage pool 140 of FIG. 1 to process.

At block 604, the example hardware manager 120 discovers available resources for the hardware resource type. For example, the resource discoverer 122 (FIGS. 1 and 3) may poll HDD storage units in the HDD storage pool 140 to determine which HDD storage units are allocated to a workload domain and which HDD storage units are not allocated to a workload domain.

At block 606, the example workload domain manager 110 calculates availability metric(s). For example, the resource demand analyzer 112 may determine an HDD storage unit availability percentage based on calculating an available number of HDD storage units with respect to a total number of HDD storage units in the HDD storage pool 140.

At block 608, the example workload domain manager 110 compares the availability metric(s) to historical data. For example, the resource demand analyzer 112 may compare the HDD storage unit availability percentage during a first time period to the HDD storage unit availability percentage during one or more previous time periods (e.g., during a second time period, during a third time period, etc., where the second and the third time periods are time periods that precede the first time period).

At block 610, the example workload domain manager 110 adjusts a weight factor. For example, the resource demand analyzer 112 may calculate an adjusted HDD storage unit weight factor based on the HDD storage unit availability percentage during the first time period and/or the one or more preceding time periods.

At block 612, the example workload domain manager 110 determines whether there is another hardware resource type to process. For example, the resource demand analyzer 112 may determine that the flash storage pool 150, the GPU pool 160, etc., have yet to be processed.

If, at block 612, the example workload domain manager 110 determines that there is another hardware resource type to process, control returns to block 602 to select another hardware resource type to process. If, at block 612, the example workload domain manager 110 determines that there is not another hardware resource type to process, control proceeds to block 614 to calculate a hardware resource cost. For example, the cost calculator 310 (FIG. 3) may calculate a total hardware resource cost for a hardware configuration based on a number of hardware resources for each hardware resource type, the adjusted weight factor for each corresponding hardware resource type, etc.

FIG. 7 is a flowchart representative of an example method 700 that may be performed by the example hardware manager 120 of FIGS. 1 and 4 to manage a workload domain in virtual server racks. The example method 700 begins at block 702 when the example hardware manager 120 selects a hardware resource type to process. For example, the resource status analyzer 410 (FIG. 4) may select the flash storage pool 150 of FIG. 1 to process.

At block 704, the example hardware manager 120 obtains a status of hardware resource(s). For example, the resource status analyzer 410 may poll each flash storage unit in the flash storage pool 150 to obtain an operational status (e.g., an active status, a non-operational status, etc.).

At block 706, the example hardware manager 120 determines whether a non-responsive status is detected. For example, the resource status analyzer 410 may determine that a flash storage unit in the first flash storage set 152 of FIG. 1 is non-responsive.

If, at block 706, the example hardware manager 120 does not detect a non-responsive status, control proceeds to block 718 to determine whether there is another hardware resource type to process. If, at block 706, the example hardware manager 120 detects a non-responsive status, at block 708, the hardware manager 120 selects a non-responsive hardware resource to process. For example, the resource status analyzer 410 may select a non-responsive flash storage unit in the first flash storage set 152 to process.

At block 710, the example hardware manager 120 deallocates the selected non-responsive hardware resource. For example, the resource deallocator 400 (FIG. 4) may deallocate the selected non-responsive flash storage unit in the first flash storage set 152 from the workload domain.

At block 712, the example hardware manager 120 discovers an available hardware resource. For example, the resource discoverer 122 may poll each flash storage unit in the flash storage pool 150 to locate an available flash storage unit that can replace the non-responsive flash storage unit.

At block 714, the example hardware manager 120 allocates a replacement hardware resource. For example, the resource allocator 124 may add an available flash storage unit discovered at block 712 to the workplace domain. In such an example, the available flash storage unit may be added to the first flash storage set 152.

At block 716, the example hardware manager 120 determines whether there is another non-responsive hardware resource to process. For example, the resource status analyzer 410 may determine that there is another non-responsive flash storage unit in the first flash storage set 152 to process.

If, at block 716, the example hardware manager 120 determines that there is another non-responsive hardware resource to process, control returns to block 708 to select another non-responsive hardware resource to process. If, at block 716, the example hardware manager 120 determines that there is not another non-responsive hardware resource to process, at block 718, the hardware manager 120 determines whether there is another hardware resource type to process. For example, the resource status analyzer 410 may determine that the HDD storage pool 140, the GPU pool 160, etc., has not yet been processed.

If, at block 718, the example hardware manager 120 determines that there is another hardware resource type to process, control returns to block 702 to select another hardware resource type to process, otherwise the example method 700 concludes.

Figure 8:
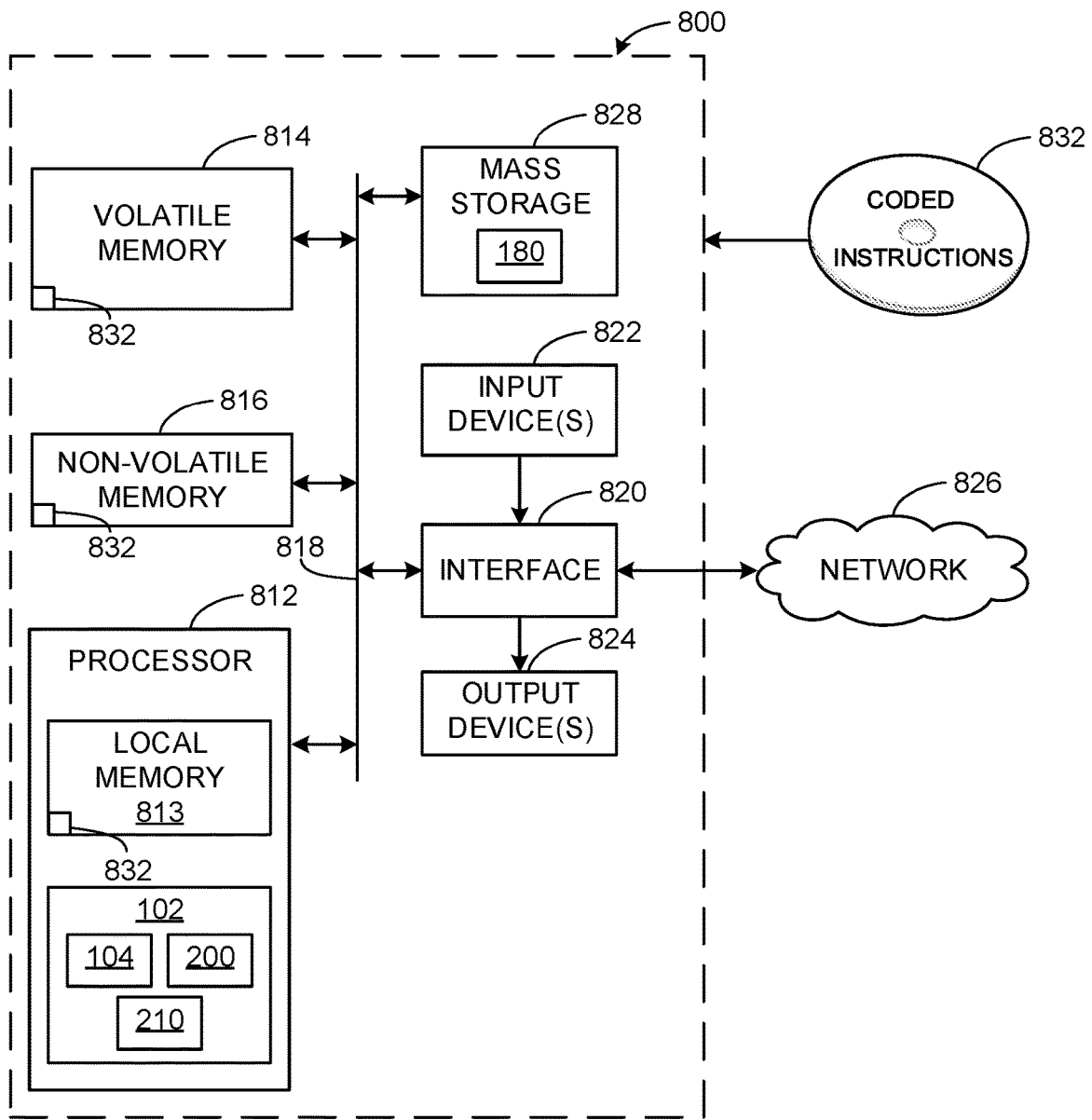
FIG. 8 is an example processor platform capable of executing the example computer readable instructions represented by FIG. 5 to implement the example requirement manager of FIGS. 1-2 to generate and manage workload domains in virtual server racks in accordance with the teachings of this disclosure.

FIG. 8 is a block diagram of an example processor platform 800 capable of executing the instructions of FIG. 5 to implement the example requirement manager 102 of FIGS. 1-2. The processor platform 800 can be, for example, a server or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor 812 may be a semiconductor based (e.g., silicon based) device. In this example, the processor 812 implements the example requirement manager 102 and the example requirement translator 104 of FIGS. 1-2, and the example user interface 200 and the example alert generator 210 of FIG. 2.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a peripheral component interconnect (PCI) express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, an isopoint device, and/or a voice recognition system. In some examples, the input device(s) 822 implements the example user interface 200.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip and/or a graphics driver processor. In some examples, the output device(s) 824 implements the example user interface 200.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disk (RAID) systems, and digital versatile disk (DVD) drives. The example mass storage device 828 implements the database 180 of FIG. 1.

Example coded instructions 832 implement the example machine readable instructions of FIG. 5 and may be stored in the mass storage device 828, in the volatile memory 814, in the non-volatile memory 816, and/or on a removable non-transitory computer readable storage medium such as a CD or DVD.

Figure 9:
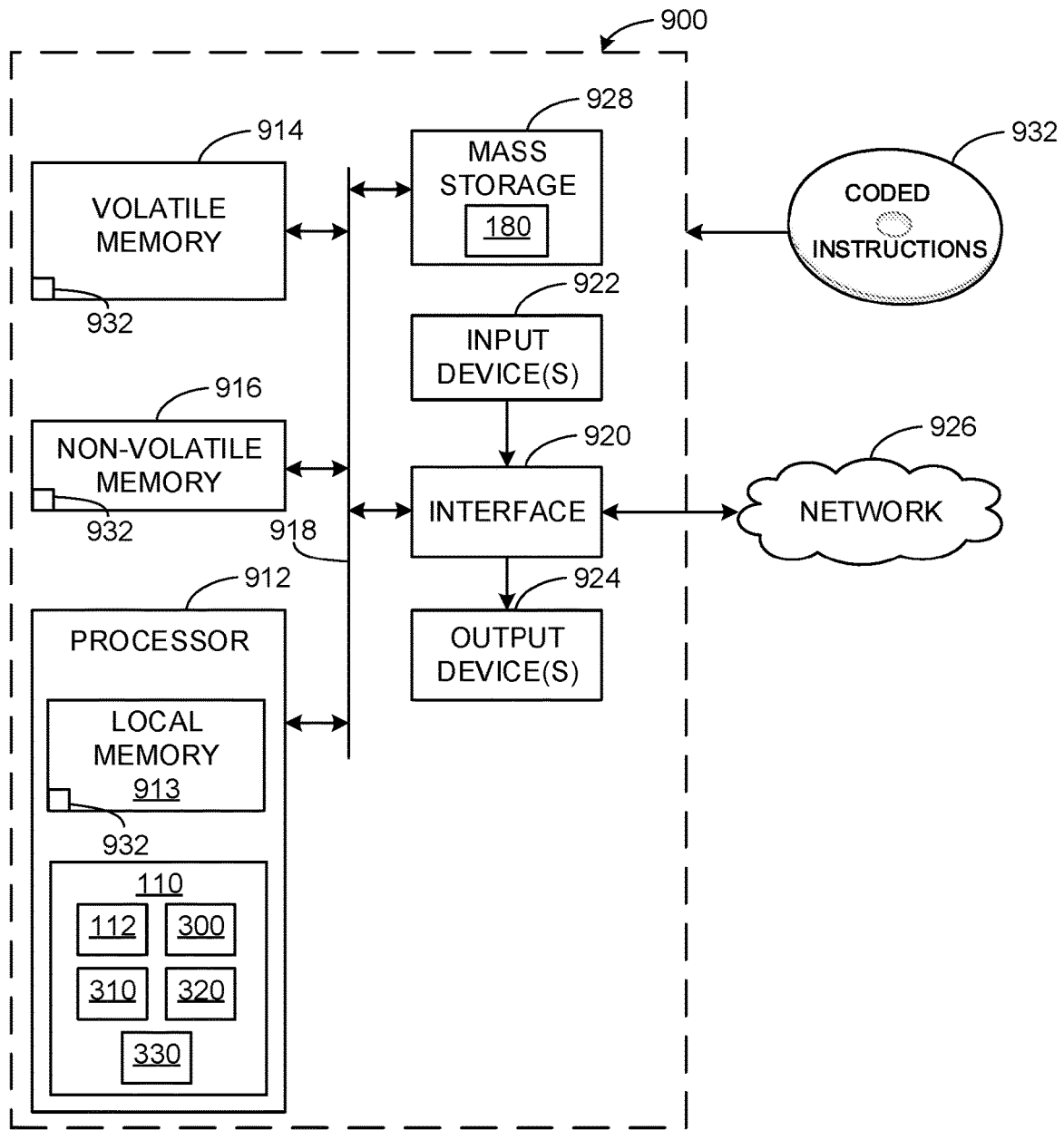
FIG. 9 is an example processor platform capable of executing the example computer readable instructions represented by FIGS. 5-6 to implement the example workload domain manager of FIGS. 1 and 3 to generate and manage workload domains in virtual server racks in accordance with the teachings of this disclosure.

FIG. 9 is a block diagram of an example processor platform 900 capable of executing the instructions of FIGS. 5-6 to implement the example workload domain manager 110 of FIGS. 1 and 3. The processor platform 900 can be, for example, a server or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor 912 may be a semiconductor based (e.g., silicon based) device. In this example, the processor 912 implements the example workload domain manager 110, and the example resource demand analyzer 112 of FIGS. 1 and 3, and the example option generator 300, the example cost calculator 310, the example option ranker 320, and the example error analyzer 330 of FIG. 3.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by SDRAM, DRAM, RDRAM, and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a USB, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuit 920 of the illustrated example. The output devices 924 can be implemented, for example, by display devices (e.g., an LED, an OLED, a liquid crystal display, a CRT, a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a DSL, a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and DVD drives. The example mass storage device 928 implements the database 180 of FIG. 1.

Example coded instructions 932 implement the machine readable instructions of FIGS. 5-6 and may be stored in the mass storage device 928, in the volatile memory 914, in the non-volatile memory 916, and/or on a removable non-transitory computer readable storage medium such as a CD or DVD.

Figure 10:
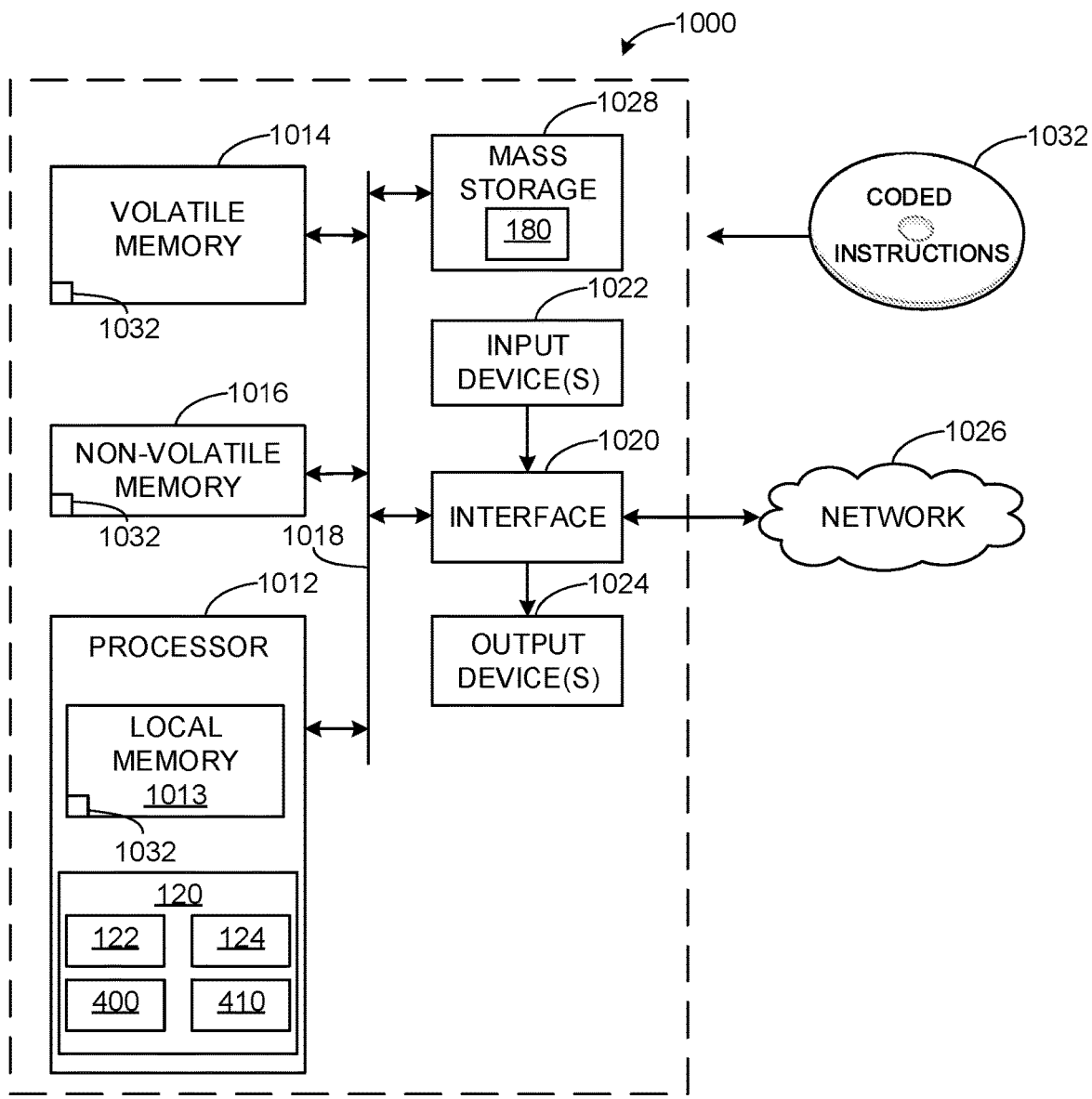
FIG. 10 is an example processor platform capable of executing the example computer readable instructions represented by FIGS. 5-7 to implement the example hardware manager of FIGS. 1 and 4 to generate and manage workload domains in virtual server racks in accordance with the teachings of this disclosure.

FIG. 10 is a block diagram of an example processor platform 1000 capable of executing the instructions of FIGS. 5-7 to implement the example hardware manager of FIGS. 1 and 4. The processor platform 1000 can be, for example, a server or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The hardware processor 1012 may be a semiconductor based (e.g., silicon based) device. In this example, the processor 1012 implements the example hardware manager 120, the example resource discoverer 122, and the example resource allocator 124 of FIGS. 1 and 4, and the example resource deallocator 400 and the example resource status analyzer 410 of FIG. 4.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by SDRAM, DRAM, RDRAM and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a USB, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuit 1020 of the illustrated example. The output devices 1024 can be implemented, for example, by display devices (e.g., an LED, an OLED, a liquid crystal display, a CRT, a touchscreen, a tactile output device, a printer and/or speakers). The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a DSL, a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and DVD drives. The example mass storage device 1028 implements the database 180 of FIG. 1.

Example coded instructions implement the machine readable instructions 1032 of FIGS. 5-7 and may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that improve an efficiency of executing an application using a virtualized server. In the above-disclosed examples, a server can be composed using one or more pooled hardware resources to right-size a virtualized server to meet user requirements. In the above-disclosed examples, a market-driven approach to pricing a pooled hardware resource improves an efficiency of maximizing a return on infrastructure investment by allocating pooled hardware resources to one or more workload domains based on a demand for the pooled hardware resources.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a requirement translator to map a requirement to a hardware resource type, one or more hardware resources of the hardware resource type to execute an application in a first workload domain;
   a cost calculator to:
      determine a demand for the hardware resource type based on a plurality of hardware resources of the hardware resource type allocated across a plurality of workload domains, the demand based on a calculation of an availability metric corresponding to a pool of the plurality of the hardware resources;
      calculate a cost for a first hardware resource of the plurality of the hardware resources based on the demand for the hardware resource type;
   an option generator to determine whether the cost exceeds a cost budget;
   and a resource allocator to add the first hardware resource to the first workload domain based on the cost not exceeding the cost budget.

2. The apparatus of claim 1, wherein the resource allocator is to add the first hardware resource to the first workload domain after the first workload domain is deployed.

3. The apparatus of claim 1, further including a user interface to prompt a user to adjust the requirement when the option generator is unable to determine one or more options for the first hardware resource without exceeding the cost budget.

4. The apparatus of claim 1, wherein the option generator is to generate one or more options, and further including an option ranker to:
rank the one or more options based on the cost budget; and
select the first hardware resource to be added to the first workload domain based on the first hardware resource being included in a highest ranked one of the one or more options.

5. The apparatus of claim 1, wherein the requirement translator is to map the requirement via an automated execution.

6. An apparatus comprising:
a requirement translator to map a requirement to a hardware resource type, one or more hardware resources of the hardware resource type to execute an application in a first workload domain;
a cost calculator to:
determine a demand for the hardware resource type based on a plurality of hardware resources of the hardware resource type allocated across a plurality of workload domains; and
calculate a cost for a first hardware resource of the plurality of the hardware resources based on the demand for the hardware resource type by adjusting a weight factor for the hardware resource type of the first hardware resource based on an availability of the hardware resource type;
an option generator to determine whether the cost exceeds a cost budget; and
a resource allocator to add the first hardware resource to the first workload domain based on the cost not exceeding the cost budget.

7. The apparatus of claim 6, wherein the cost calculator is to calculate the cost for the first hardware resource based on the weight factor and a base cost associated with the first hardware resource.

8. A method comprising:
mapping a requirement to a hardware resource type, one or more hardware resources of the hardware resource type to execute an application in a first workload domain;
determining a demand for the hardware resource type based on a plurality of hardware resources of the hardware resource type allocated across a plurality of workload domains, the demand based on a calculation of an availability metric corresponding to a pool of the plurality of the hardware resources;
calculating a cost for a first hardware resource of the plurality of the hardware resources based on the demand for the hardware resource type; and
adding the first hardware resource to the first workload domain based on the cost not exceeding a cost budget.

9. The method of claim 8, wherein adding the first hardware resource to the first workload domain is done after the first workload domain is deployed.

10. The method of claim 8, further including prompting a user to adjust the requirement in response to the cost exceeding the cost budget.

11. The method of claim 8, further including:
ranking one or more generated options based on the cost budget; and
selecting the first hardware resource to be added to the first workload domain based on the first hardware resource being included in a highest ranked one of the one or more generated options.

12. The method of claim 8, further including, in response to determining that the first hardware resource is non-responsive, replacing the first hardware resource with a second hardware resource of the same hardware resource type.

13. The method of claim 8, wherein the mapping of the requirement to the hardware resource type is completed via an automated execution.

14. A method comprising:
mapping a requirement to a hardware resource type, one or more hardware resources of the hardware resource type to execute an application in a first workload domain;
determining a demand for the hardware resource type based on a plurality of hardware resources of the hardware resource type allocated across a plurality of workload domains;
calculating a cost for a first hardware resource of the plurality of the hardware resources based on the demand for the hardware resource type by adjusting a weight factor for the hardware resource type of the first hardware resource based on an availability of the hardware resource type; and
adding the first hardware resource to the first workload domain based on the cost not exceeding a cost budget.

15. The method of claim 14, wherein the calculating of the cost for the first hardware resource is based on the weight factor and a base cost associated with the first hardware resource.

16. A non-transitory computer readable storage medium comprising instructions which, when executed, cause a machine to at least:
map a requirement to a hardware resource type, one or more hardware resources of the hardware resource type to execute an application in a first workload domain;
determine a demand for the hardware resource type based on a plurality of hardware resources of the hardware resource type allocated across a plurality of workload domains, the demand based on a calculation of an availability metric corresponding to a pool of the plurality of the hardware resources;
calculate a cost for a first hardware resource of the plurality of the hardware resources based on the demand for the hardware resource type; and
add the first hardware resource to the first workload domain based on the cost not exceeding a cost budget.

17. The non-transitory computer readable storage medium of claim 16, wherein the instructions, when executed, cause the machine to add the first hardware resource to the first workload domain after the first workload domain is deployed.

18. The non-transitory computer readable storage medium of claim 16, wherein the instructions, when executed, cause the machine to prompt a user to adjust the requirement when the cost exceeds the cost budget.

19. The non-transitory computer readable storage medium of claim 16, wherein the instructions, when executed, cause the machine to:
rank one or more generated options based on the cost budget; and select the first hardware resource to be added to the first workload domain based on the first hardware resource being included in a highest ranked one of the one or more generated options.

20. The non-transitory computer readable storage medium of claim 16, wherein the instructions, when executed, cause the machine to replace the first hardware resource with a second hardware resource of the same hardware resource type when the first hardware resource is determined to be non-responsive.

21. The non-transitory computer readable storage medium of claim 16, wherein the instructions, when executed, cause the machine to map the requirement via an automated execution.

22. A non-transitory computer readable storage medium comprising instructions which, when executed, cause a machine to at least:
    map a requirement to a hardware resource type, one or more hardware resources of the hardware resource type to execute an application in a first workload domain;
    determine a demand for the hardware resource type based on a plurality of hardware resources of the hardware resource type allocated across a plurality of workload domains;
    calculate a cost for a first hardware resource of the plurality of the hardware resources based on the demand for the hardware resource type by adjusting a weight factor for the hardware resource type of the first hardware resource based on an availability of the hardware resource type; and
    add the first hardware resource to the first workload domain based on the cost not exceeding a cost budget.

23. The non-transitory computer readable storage medium of claim 22, wherein the instructions, when executed, cause the machine to calculate the cost for the first hardware resource based on the weight factor and a base cost associated with the first hardware resource.

* * * * *